US009544134B2

(12) United States Patent
Aissi et al.

(10) Patent No.: US 9,544,134 B2
(45) Date of Patent: *Jan. 10, 2017

(54) SEARCHABLE ENCRYPTED DATA

(71) Applicant: Visa International Service Association, San Francisco, CA (US)

(72) Inventors: Selim Aissi, Menlo Park, CA (US); Sekhar Nagasundaram, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,686

(22) Filed: Dec. 28, 2015

(65) Prior Publication Data

US 2016/0112190 A1 Apr. 21, 2016

Related U.S. Application Data

(63) Continuation of application No. 13/965,472, filed on Aug. 13, 2013, now Pat. No. 9,256,764.

(Continued)

(51) Int. Cl.
*G06F 21/64* (2013.01)
*G06F 17/30* (2006.01)
(Continued)

(52) U.S. Cl.
CPC ............ H04L 9/08 (2013.01); *G06F 17/30312* (2013.01); *G06F 17/30321* (2013.01);
(Continued)

(58) Field of Classification Search
CPC .................... G06F 17/30091; G06F 17/30094; G06F 17/30097; G06F 17/301; G06F 17/30106; G06F 17/30109; G06F 17/30312; G06F 17/30011; G06F 17/30628; G06F 17/30631; G06F 2207/00; G06F 2207/025; H04L 2209/56

See application file for complete search history.

(56) References Cited

U.S. PATENT DOCUMENTS 6,212,606 B1 4/2001 Dimitroff
6,526,406 B1 2/2003 Suzuki et al.
(Continued)

FOREIGN PATENT DOCUMENTS

KR 10-2011-0127791 A 11/2011

OTHER PUBLICATIONS

Anonymous, Steve, "Index on encrypted column," Nov. 15, 2009, XP055246170, retrieved Jan. 29, 2016 from URL:https://web.archive.org/web/20091115095136/http://www.sqlservercentral.com/Forums/Topic815647-146-1.axpx.

(Continued)

*Primary Examiner* — Eleni Shiferaw
*Assistant Examiner* — Nelson Giddins
(74) *Attorney, Agent, or Firm* — Kilpatrick Townsend & Stockton, LLP

(57) ABSTRACT

Embodiments of the invention broadly described, introduce systems and methods for enabling the searching of encrypted data. One embodiment of the invention discloses a method for generating a searchable encrypted database. The method comprises receiving a plurality of sensitive data records comprising personal information of different users, identifying one or more searchable fields for the sensitive data records, wherein each searchable field is associated with a subset of the personal information for a user, generating a searchable field index for each of the one or more searchable fields, and encrypting the sensitive data records using a database encryption key.

20 Claims, 10 Drawing Sheets

Related U.S. Application Data

(60) Provisional application No. 61/683,659, filed on Aug. 15, 2012.

(51) Int. Cl.
    *G06F 21/62*     (2013.01)
    *G06F 21/60*     (2013.01)
    *H04L 9/08*     (2006.01)

(52) U.S. Cl.
    CPC ...... *G06F 17/30867* (2013.01); *G06F 21/606* (2013.01); *G06F 21/6245* (2013.01); *G06F 21/64* (2013.01); *G06F 17/301* (2013.01); *G06F 17/30091* (2013.01); *G06F 17/30097* (2013.01); *G06F 17/30106* (2013.01); *G06F 17/30109* (2013.01); *G06F 2207/00* (2013.01); *G06F 2207/025* (2013.01)

(56) References Cited

U.S. PATENT DOCUMENTS

| | | | |
|---|---|---|---|
| 6,963,980 | B1 | 11/2005 | Mattsson |
| 7,519,183 | B2 | 4/2009 | Adachi et al. |
| 7,756,894 | B2 | 7/2010 | Kurose |
| 7,870,614 | B1* | 1/2011 | Duhaime et al. ............... 726/28 |
| 7,874,013 | B2 | 1/2011 | Kaminaga et al. |
| 8,131,738 | B2 | 3/2012 | Gerber |
| 8,266,430 | B1 | 9/2012 | Lumb |
| 8,380,720 | B2 | 2/2013 | Chang et al. |
| 8,533,489 | B2 | 9/2013 | Roeder et al. |
| 8,694,646 | B1* | 4/2014 | Kothari et al. ............... 709/227 |
| 8,769,613 | B2* | 7/2014 | Latchem et al. .................. 726/3 |
| 9,059,851 | B2 | 6/2015 | Movshovitz |
| 2001/0019614 | A1 | 9/2001 | Madoukh |
| 2002/0174355 | A1 | 11/2002 | Rajasekaran et al. |
| 2004/0083395 | A1 | 4/2004 | Blechman |
| 2005/0132196 | A1* | 6/2005 | Dietl ............................ 713/176 |
| 2006/0041533 | A1 | 2/2006 | Koyfman |
| 2006/0129545 | A1 | 6/2006 | Golle et al. |
| 2006/0149962 | A1 | 7/2006 | Fountain et al. |
| 2007/0143840 | A1 | 6/2007 | Arroyo et al. |
| 2007/0250700 | A1 | 10/2007 | Sidhu et al. |
| 2008/0077806 | A1* | 3/2008 | Cui et al. ..................... 713/193 |
| 2008/0133935 | A1 | 6/2008 | Elovici et al. |
| 2009/0113213 | A1 | 4/2009 | Park et al. |
| 2009/0222675 | A1 | 9/2009 | Lange et al. |
| 2009/0300351 | A1 | 12/2009 | Lei et al. |
| 2010/0005073 | A1* | 1/2010 | Bousquet et al. ................ 707/3 |
| 2010/0011000 | A1 | 1/2010 | Chakra et al. |
| 2010/0042846 | A1* | 2/2010 | Trotter et al. ................. 713/182 |
| 2010/0067698 | A1 | 3/2010 | Hahn et al. |
| 2010/0070518 | A1 | 3/2010 | Park et al. |
| 2010/0153403 | A1 | 6/2010 | Chang et al. |
| 2010/0246827 | A1 | 9/2010 | Lauter et al. |
| 2010/0306221 | A1 | 12/2010 | Lokam et al. |
| 2011/0040753 | A1 | 2/2011 | Knight |
| 2011/0145580 | A1* | 6/2011 | Auradkar et al. ............ 713/170 |
| 2011/0145593 | A1 | 6/2011 | Auradkar et al. |
| 2011/0145594 | A1 | 6/2011 | Jho et al. |
| 2011/0178927 | A1 | 7/2011 | Lindelsee et al. |
| 2012/0016884 | A1 | 1/2012 | Rowney et al. |
| 2012/0066769 | A1* | 3/2012 | Latchem et al. ................ 726/26 |
| 2012/0131355 | A1* | 5/2012 | Nishimura .................... 713/189 |
| 2012/0209884 | A1 | 8/2012 | Mattsson et al. |
| 2012/0233471 | A1* | 9/2012 | Duhaime et al. ............. 713/189 |
| 2012/0297201 | A1* | 11/2012 | Matsuda et al. ............. 713/189 |
| 2013/0042108 | A1* | 2/2013 | Cancedda ..................... 713/168 |
| 2013/0046995 | A1* | 2/2013 | Movshovitz .................. 713/189 |
| 2013/0067225 | A1* | 3/2013 | Shochet et al. ............... 713/165 |
| 2013/0238646 | A1* | 9/2013 | Maro ............................ 707/758 |
| 2013/0287206 | A1 | 10/2013 | Hattori et al. |
| 2014/0010371 | A1* | 1/2014 | Khazan et al. ................ 380/278 |
| 2014/0013452 | A1* | 1/2014 | Aissi et al. ..................... 726/30 |
| 2014/0019765 | A1 | 1/2014 | Montalvo et al. |
| 2014/0052999 | A1* | 2/2014 | Aissi et al. ................... 713/189 |
| 2014/0298009 | A1 | 10/2014 | Hattori et al. |
| 2015/0143112 | A1* | 5/2015 | Yavuz et al. .................. 713/165 |

OTHER PUBLICATIONS

Boneh, Dan, et al., "Public Key Encryption with Keyword Search," Advances in Cryptology, 2004, 15 pages.

Garcia, Raul, "Indexing encrypted data," Apr. 13, 2012, XP055246165, retrieved Jan. 29, 2016 from URL:https://web.archive.org/web/20120413220203/http://blogs.msdn.com/b/raulga/archive/2006/03/11/549754.aspx.

Ming, Li, et al., "Authorized Private Keyword Search over Encrypted Personal Health Records in Cloud Computing", Jun. 20, 2011, IEEE Computer Society Washington, DC, ICDCS '11 Proceedings of the 2011 31st International Conference on Distributed Computing Systems, pp. 383-392.

Yang, Zhiqiang, et al., "Privacy-Preserving Queries on Encrypted Data," Proceedings of the 11th European Symposium on Research in Computer Security (Esorics), 2006, 18 pages.

International Search Report and Written Opinion mailed Nov. 27, 2013 in PCT Application No. PCT/US2013/054779, 12 pages.

Office Action mailed Feb. 9, 2016 in European patent application No. 13829772.6-1870, 12 pages.

\* cited by examiner

SEARCHABLE ENCRYPTED DATA

CROSS-REFERENCES TO RELATED APPLICATIONS

The present application is a continuation of U.S. Patent Application No. 13/965,472, filed on Aug. 13, 2013, which is a non-provisional application of and claims priority to U.S. Provisional Application No. 61/683,659, filed on Aug. 15, 2012, the entire contents of which are herein incorporated by reference in their entireties for all purposes.

BACKGROUND

As the internet continues to gain popularity, the need to store sensitive personal information on untrusted server computers is growing. For example, in order to provide users with fast response times, many organizations are offloading data storage and processing to third-party data centers geographically close to users. In addition, storage as a service and other "cloud" services are gaining popularity with organizations for cost and scalability reasons. Typically, these services are operated by third party organizations with uncertain security standards. Thus, ensuring the security of data at rest continues to be a necessity.

In order to address this problem, some systems may upload encrypted data to an untrusted server computer. Although data encryption is a well-known technique to protect sensitive personal information, encryption typically precludes searching. Thus, in order for a user to search an encrypted database for a desirable row, the user must first download and decrypt the entire database. This requires an excessive amount of bandwidth and processing, especially for large databases.

Embodiments of the invention address these and other problems.

SUMMARY

Embodiments of the invention broadly described, introduce systems and methods for enabling the searching of encrypted data.

One embodiment of the invention discloses a data encryption computer. The data encryption computer comprises a processor and a non-transitory computer-readable storage medium, comprising code executable by the processor for implementing a method comprising receiving a plurality of sensitive data records comprising personal information of different users, identifying one or more searchable fields for the sensitive data records, wherein each searchable field is associated with a subset of the personal information for a user, generating a searchable field index for each of the one or more searchable fields, and encrypting the sensitive data records using a database encryption key.

One embodiment of the invention discloses a computer-implemented method for searching an encrypted database. The method comprises receiving personal information of a user, generating one or more index values, each associated with a searchable field index, using the personal information, sending the one or more index values, receiving one or more encrypted data records matching the index values, and decrypting the encrypted data records using a database decryption key.

One embodiment of the invention discloses a computer-implemented method for searching an encrypted database. The method comprises receiving one or more index values for searchable field indices, wherein the index values are generated using personal information of a user, retrieving one or more encrypted data records using the index values, and sending the one or more encrypted data records.

Further details regarding embodiments of the invention can be found in the Detailed Description and the Figures.

DETAILED DESCRIPTION

Figure 1:
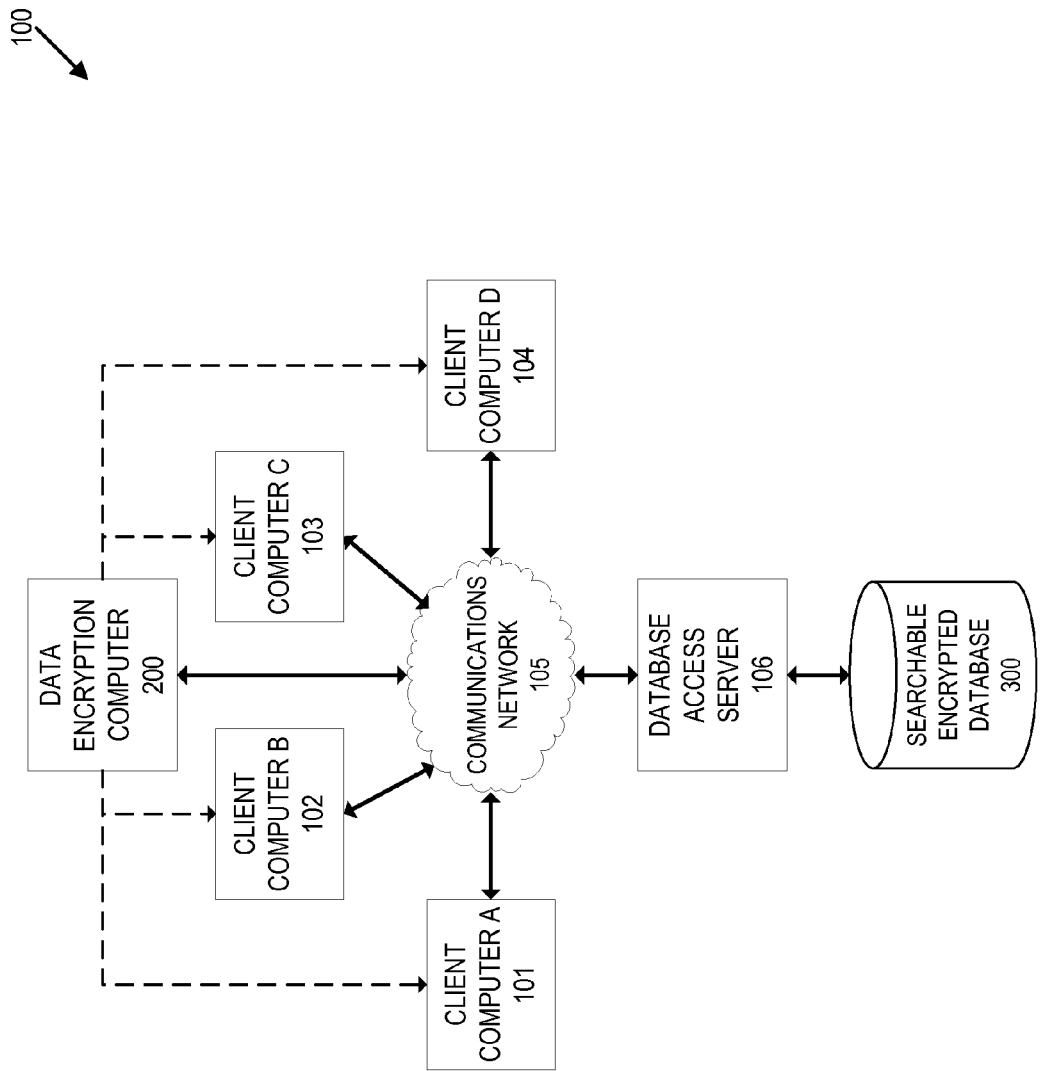
FIG. 1 shows a system for use of a searchable encrypted database.

Prior to discussing embodiments of the invention, descriptions of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "sensitive data record" may include any data record comprising one or more "sensitive data fields" such as personal information, financial information, protected information, private, or otherwise sensitive data for a plurality of users. For example, a sensitive data record may comprise a user's full name, credit card number, health records, driver's license number, and password.

The term "searchable field" may include any field that may be used for searching or retrieving a sensitive data record. In some cases, a searchable field may comprise a field in the sensitive data record or a portion of a field in a sensitive data record, such as a subset of personal information for a user. Examples of searchable fields may include a user's first initial and last name, the last four digits of a user's credit card number, or a user's zip code.

The term "searchable field value" may include a value for a searchable field for a sensitive data record. For example, for a sensitive data record comprising a user's name of "John Smith, and the user's social security number "001-23-4567", a searchable field may be the last four digits of the user's social security number. Accordingly, the searchable field value for the user would be "4567".

The "sensitivity of a searchable field" may include an indication of the degree to which a searchable field value for the field should be protected. For example, a searchable field of the last four digits of the user may be considered "non-sensitive", because that information is generally considered publically available and not personally identifiable. However, a searchable field of the user's first and last name may be considered "sensitive", since it may indicate the identity of the user if known. Further, a searchable field of the user's full social security number may be considered "highly sensitive", as a social security number is generally expected to be kept secret.

The term "searchable field index" may include an index, database column, map, or other data structure used to associate a searchable field value with a data record. A searchable field index may comprise one or more "searchable field index values", which may include any transformed or non-transformed searchable field value. For example, for a searchable field of a user's name, the searchable field value may be "John Smith", and searchable field index value for a user may be the hashed name in the SHA-2 format (e.g., "5078093fdf75a673"). The searchable field index may map each searchable field index values to an associated data record. Thus, the hash of the user's name may later be used to retrieve the user's data record.

In some embodiments of the invention, a plurality of searchable field indices may be associated with a data record. For example, in some embodiments, the one or more searchable field indices may be stored in the same row in a database table as the data record. In such embodiments, a SQL query or other search may be performed to retrieve row(s) with specific searchable field index values for the searchable field indices.

The term "searchable encrypted database" may include any database, table, or other collection of data comprising encrypted data records and one or more searchable field indices. An "encrypted data record" may include a sensitive data record that has been encrypted. An encrypted data record may comprise one or more encrypted data fields. In some embodiments, all sensitive data records may be encrypted using a "database encryption key", which may include any encryption key or other secret data. In other embodiments, the sensitive data records may be encrypted individually or in groups. A searchable encrypted database may be operable to retrieve one or more encrypted data records by matching searchable field index values associated with the data records.

The term "search parameters" may include a collection of one or more searchable field index values or other parameters used to determine encrypted data records to retrieve from a searchable encrypted database. For example, a record for a user "John Smith" may be retrieved by providing a first searchable field index value of "5078093fdf75a673" corresponding to his name, and a second searchable field index value of "4567" corresponding to the last 4 digits of his credit card number. The provided index values may be matched against the searchable field indices for name and credit card number to determine an encrypted data record associated with the user.

Embodiments of the invention provide for many technical advantages. For example, embodiments of the invention enable the searching of encrypted data stored by a server without requiring the server to decrypt the data. It is often necessary to store sensitive data on untrusted servers. For example, organizations may upload data to third party caching servers closer to their users, or may store data in cloud servers for backup or scalability reasons. In some cases, these servers may not be operated by the organization, and may be vulnerable to security compromises. In some embodiments, these problems may be addressed by encrypting sensitive data records using a database encryption key and generating searchable field indices at a data encryption computer, then sending the encrypted data records and searchable field indices to the third party service. Since the database encryption key is not shared with the third party server, the content of sensitive data is obfuscated. However, the data may still be searched using the searchable field indices.

Embodiments of the invention provide the further technical advantage of enabling scalable access to the encrypted data. In embodiments of the invention, a plurality of clients or client may be given access to the searchable encrypted database by providing the clients with the database decryption key. Subsequently, the searchable encrypted database may be searched by clients in parallel and without performing additional authentication of the clients. This provides the additional benefit of allowing the use of commercial off-the-shelf (COTS) database software with minimal to no changes to support searching encrypted data. Therefore, embodiments of the invention reduce complexity and improve efficiency of searchable encrypted databases.

Embodiments of the invention provide the further technical advantage of enabling different access control levels for various users of the database. For example, it may be desirable to restrict some users of the database from retrieving records using certain searchable fields (e.g., by encrypting index values with a searchable field key). In one case, low level employees of a call center may not be provided a field key allowing the search of a customer's personal information using only the customer's name. This may discourage the low level employees from stealing customer information for customers with common or previously known names. Rather, the customer name must be provided with some other information (e.g., the last 4 digits of the customer's credit card number). Thus, possible fraud may be prevented. Later, once the employee has been vetted or proven trustworthy, the field key may be provided. Therefore, by controlling access to certain searchable fields, embodiments of the invention may improve the security of the sensitive data records.

The above examples highlight only a few of the advantages of searchable encrypted databases in accordance with embodiments of the invention.

I. Exemplary Searchable Encrypted Database Systems

A system 100 for use of a searchable encrypted database can be seen in FIG. 1. The system 100 includes a client computer A 101, client computer B 102, client computer C 103, client computer D 104, communications network 105, data encryption computer 200, a database access server 106, and a searchable encrypted database 300. As shown, data encryption computer 200 may be in communication with each of the client computers 101, 102, 103, 104 and may distribute one or more encryption keys to the client computers 101-104. Communications network 105 may facilitate data transmissions between client computers 101-104 and database access server 106. Client computers 101-104 may run one or more applications, which may connect to database access server 106 in order to search for encrypted data stored in searchable encrypted database 300.

A suitable communications network 105 may be any one and/or the combination of the following: a direct interconnection; the internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol MAP), I-mode, and/or the like); and/or the like.

Figure 2:
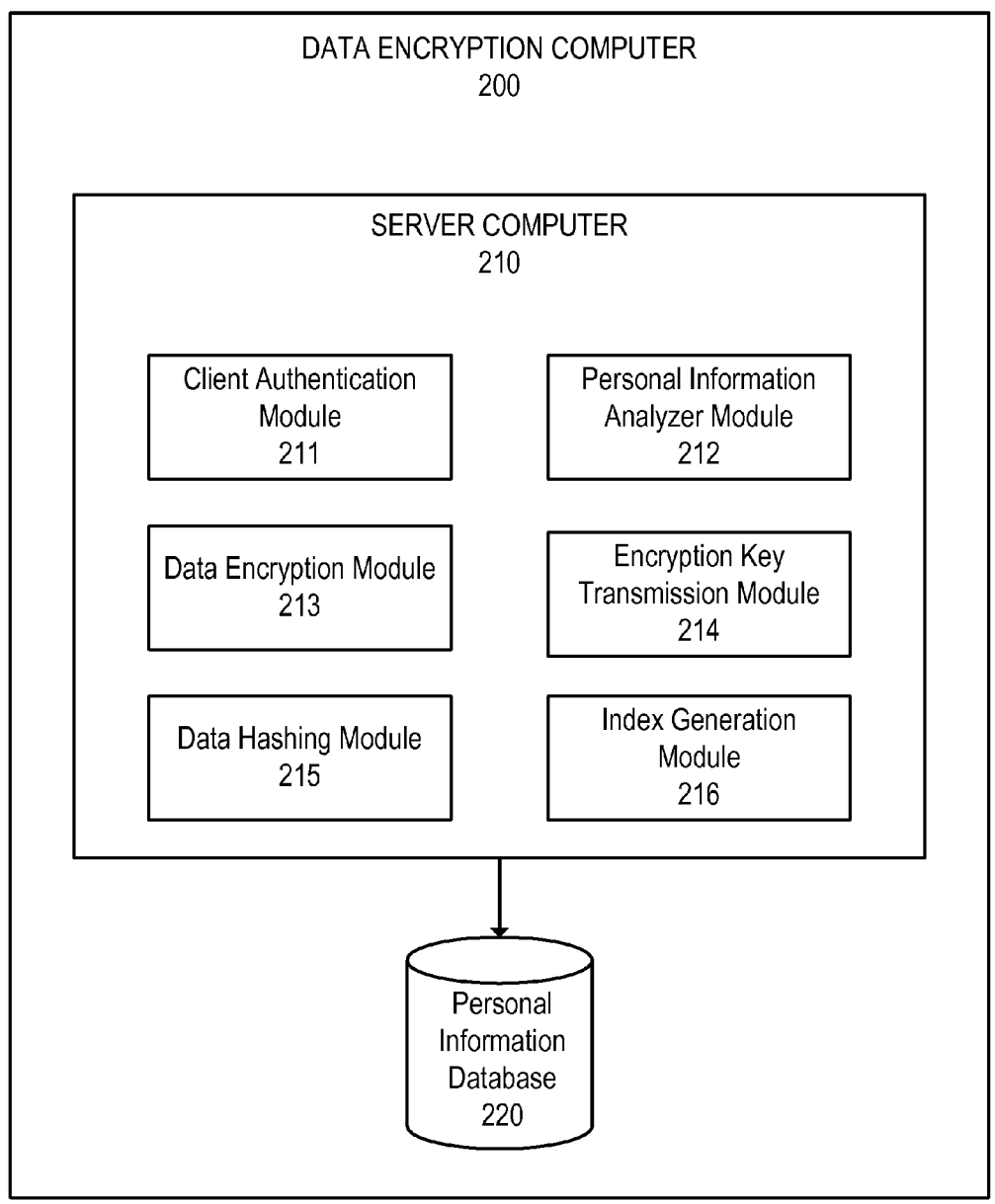
FIG. 2 shows one potential embodiment of a data encryption computer.

FIG. 2 shows one potential embodiment of a data encryption computer 200. As depicted in FIG. 2, the data encryption computer 200 may comprise a server computer 210 comprising several modules, such as client authentication module 211, personal information analyzer module 212, data encryption module 213, encryption key transmission module 214, data hashing module 215, and index generation module 216. Data encryption computer 200 may also comprise a personal information database 220. The various modules may be embodied by computer code, residing on computer readable media.

Client authentication module 211 may be configured to perform client authentication and authorization determinations. For example, client authentication module 211 may be used to determine one or more clients or client computers authorized to receive a database decryption key associated with a searchable encrypted database, or receive a field key associated with a searchable field index. Client authentication module 211 may use any suitable technique for authorization, such as a username and password login, two-factor authentication, or certificate-based authentication.

Personal information analyzer module 212 may be configured to analyze personal information, such as information stored in personal information database 220 in order to determine the sensitivity of a searchable field and a corresponding level of data protection required. For example, personal information analyzer module 212 may be used to determine the sensitivity of a searchable field comprising the last four digits of a customer's social security number, or the sensitivity of a full credit card number (e.g., a primary account number or PAN). In some embodiments, the personal information analyzer module 212 may be programmed with rules, standards, or protocols used to determine the sensitivity of a searchable field and associated data protection requirements. For example, in one embodiment relating to healthcare-related personal information, personal information analyzer module 212 may be programmed to be compliant with Health Insurance Portability and Accountability Act (HIPPA) data protection standards. Thus, any searchable fields generated from sensitive data may be protected in compliance with HIPPA standards.

Data encryption module 213 may be configured to generate encryption keys and encrypt data using the generated keys. Encryption may include any encoding of information so that unauthorized users cannot read it, but authorized users can, or as otherwise known in the art. In various embodiments of the invention, encryption may be perform using symmetric keys, or public/private key pairs. For example, a user's date of birth (e.g., "Jan. 2, 1934") may be encrypted using an encryption key to produce encrypted data (e.g., 0x34A69F), so that the encrypted data may be unreadable. An authorized user may then decrypt the data, so that the date of birth is readable.

In some embodiments, data encryption module 213 may generate database encryption keys, data decryption keys, searchable field keys, encryption keys used to communicate with client computers 101-104, or any other suitable encryption keys. Data encryption module 213 may also encrypt sensitive data records to generate encrypted data records, and encrypt searchable field values. In some embodiments, data encryption module 213 may utilize one or more hardware components, such as cryptoprocessors or trusted platform modules (TPMs).

Encryption key transmission module 214 may be configured to transmit one or more encrypted keys to client computers 101-104. For example, encryption key transmission module 214 may be used to send database decryption keys or searchable field keys. In some embodiments, encryption key transmission module 214 may communicate with client authentication module 211 to determine one or more clients or client computers authorized to receive a database decryption key or searchable field key.

Data hashing module 215 may be configured to hash data such as searchable field values. Hashing may refer to any algorithm or function that takes as input data and returns a fixed-size bit string (i.e., a hash), or as otherwise known in the art. In various embodiments, hashing may be performed using SHA-2, MD5, bcrypt, Blowfish, or any other suitable method. For example, a user's date of birth (e.g., "Dec. 3, 1945") may be hashed to generate a trusted hash (e.g., "a3b8919fcb9d2"). Subsequently, a hash generated by a user may be compared to the trusted hash in order retrieve a data record associated with the date of birth.

Index generation module 216 may be configured to generate indices, such as indices of searchable fields. For example, index generation module 216 may be configured to determine the sensitivity of a searchable field using personal information analyzer module 212, encrypt or hash searchable field values to generate searchable field index values using data encryption module 213 or data hashing module 215, respectively, and transmit searchable field encryption keys using encryption key transmission module 214. In some embodiments, index generation module 216 may generate indices using personal information database 220.

Personal information database 220 may comprise personal information for one or more customers. In some embodiments, personal information database 220 may be visible in cleartext, so that server computer 210 may read data from database 220.

Figure 3:
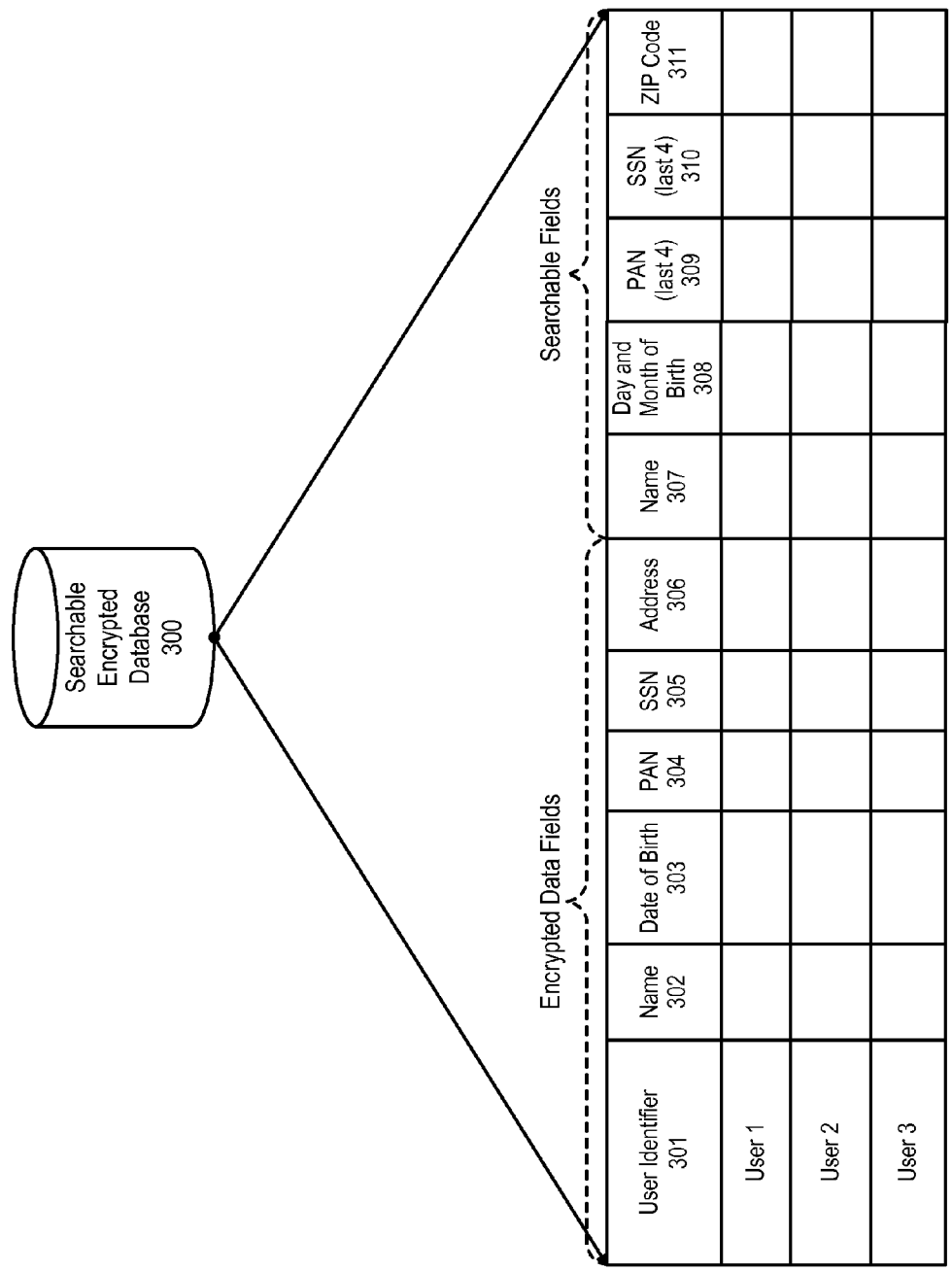
FIG. 3 shows a more detailed illustration of an exemplary embodiment of a searchable encrypted database.

With reference to FIG. 3, a more detailed illustration of an exemplary embodiment of a searchable encrypted database 300 is shown. The searchable encrypted database 300 may be configured to store encrypted data records and searchable field indices associated with the encrypted data records. Some possible data fields that may be included in the sensitive data records and searchable field indices are described. The searchable encrypted database 300 may comprise more than one database, and the databases may be in the same location or may be remotely located. In some embodiments, data stored in the searchable encrypted database 300 may include personal information. For example, the searchable encrypted database 300 may comprise a plurality of encrypted data fields such as name field 302, date of birth field 303, primary account number (PAN) field 304, social security number (SSN) field 305, and address field 306. The searchable encrypted database 300 may also include one or more searchable field indices, such as name index 307, day and month of birth index 308, PAN (last 4) index 309, SSN (last 4) index 310, and ZIP code index 311.

User identifier field 301 may include any suitable identifier for a user. For example, a user identifier may include a unique number assigned to each user (e.g., a GUID), a username associated with the user, or any other suitable identifier. For example, if the username for a user "John Smith" is jsmith45, "jsmith45" may be stored in user identifier field 301.

Name field 302 may include a user's full name or legal name. For example, for the user jsmith45, "John Smith" may be stored in name field 302 in the user's encrypted data record.

Date of birth field 303 may include a user's full date of birth. The date of birth may be stored in any suitable format, and may indicate the day, month, and year the user was born. For example, for the user jsmith45, date of birth field 303 may include "Dec. 3, 1945".

Primary account number (PAN) field 304 may include a user's credit card number, bank account number, or any other suitable account number. For example, for the user jsmith45, PAN field 304 may comprise the user's 16-digit credit card number of "4567-8901-2345-6789".

Social security number (SSN) field 305 may include a user's social security number or any other suitable government identification number associated with the user. For example, for the user jsmith45, the SSN field 305 may comprise a social security number "001-23-4567".

Address field 306 may include a user's address. The address may be a mailing address, billing address, residential address, or any other suitable address associated with the user. The address may be represented using a street name and number, geographic coordinates, or any other suitable means. For example, for user jsmith45, address field 306 may comprise "123 Main St, San Francisco, Calif., 94111".

In various embodiments of the invention, encrypted data fields 301-306 comprising an encrypted data record may be individually or collectively encrypted, such as with a database encryption key. The encrypted data record may be associated with one or more searchable field indices 307-311, as described below.

Name index 307 may include an index comprising the full or legal name of the user. Thus, in some embodiments of the invention, searchable field values associated with name index 307 may be similar to those stored in name field 320. However, in some embodiments of the invention, name index 307 may be determined to be sensitive, and so it may be hashed in order to obfuscate the field value. For example, for a user jsmith45 with a name "John Smith", a corresponding searchable field index value may be "ef61a579c907bbed674c0" (generated using a SHA-2 hash of the name "John Smith". Thus, a search parameter comprising a SHA-2 hash of "John Smith" may be used to retrieve an encrypted data record for user jsmith45 from name index 307.

Day and month of birth index 308 may include an index comprising the day and month of birth of the user. Since the day and month of birth of a user is typically not considered sensitive data, it may be stored in plaintext in the index 308. For example, for a user jsmith45 whose date of birth is "Dec. 3, 1945", the string "12/3" may be stored in day and month of birth index 308 for the user. Thus, a search parameter comprising the day and month of birth "12/3" may be used to retrieve an encrypted data record for user jsmith45 from index 308.

PAN (last 4) index 309 may include an index comprising the last four digits of the user's primary account number (PAN). Since the last four digits of a PAN is generally not considered sensitive data (as it may be printed on receipts or displayed on web pages), it may also be stored in plaintext in the index 309. For example, for a user jsmith45 whose PAN is "4567-8901-2345-6789", a corresponding searchable field index value for index 309 may be "6789". Thus, a search parameter comprising the last 4-digits of the PAN "6789" may be used to retrieve an encrypted data record for user jsmith45 from index 309.

SSN (last 4) index 310 may include an index comprising the last four digits of the user's social security number (SSN). Since the last four digits of a SSN is generally considered highly sensitive data (as it may be used to impersonate an individual), it may be stored as a hash-based message authentication code (HMAC) in index 310. Accordingly, a searchable field key may be generated for index 310 and used to generate the HMAC index values. For example, for a user jsmith45 whose SSN is "001-23-4567", a corresponding searchable field index value for index 309 may be "bee0b8cfdac4a". Thus, a search parameter comprising the HMAC of "4567" generated using the searchable field key may be used to retrieve an encrypted data record for user jsmith45 from index 310.

ZIP code index 311 may include an index comprising a zip code associated with a user. Since the zip code of a user is typically not considered sensitive data, it may be stored in plaintext in the index 311. For example, for a user jsmith45 whose address is "123 Main St, San Francisco, Calif., 94111", the string "94111" may be stored in day zip code index 311 for the user. Thus, a search parameter comprising the zip code "94111" may be used to retrieve an encrypted data record for user jsmith45 from index 311.

II. Exemplary Searchable Encrypted Database Generation Methods

Figure 4:
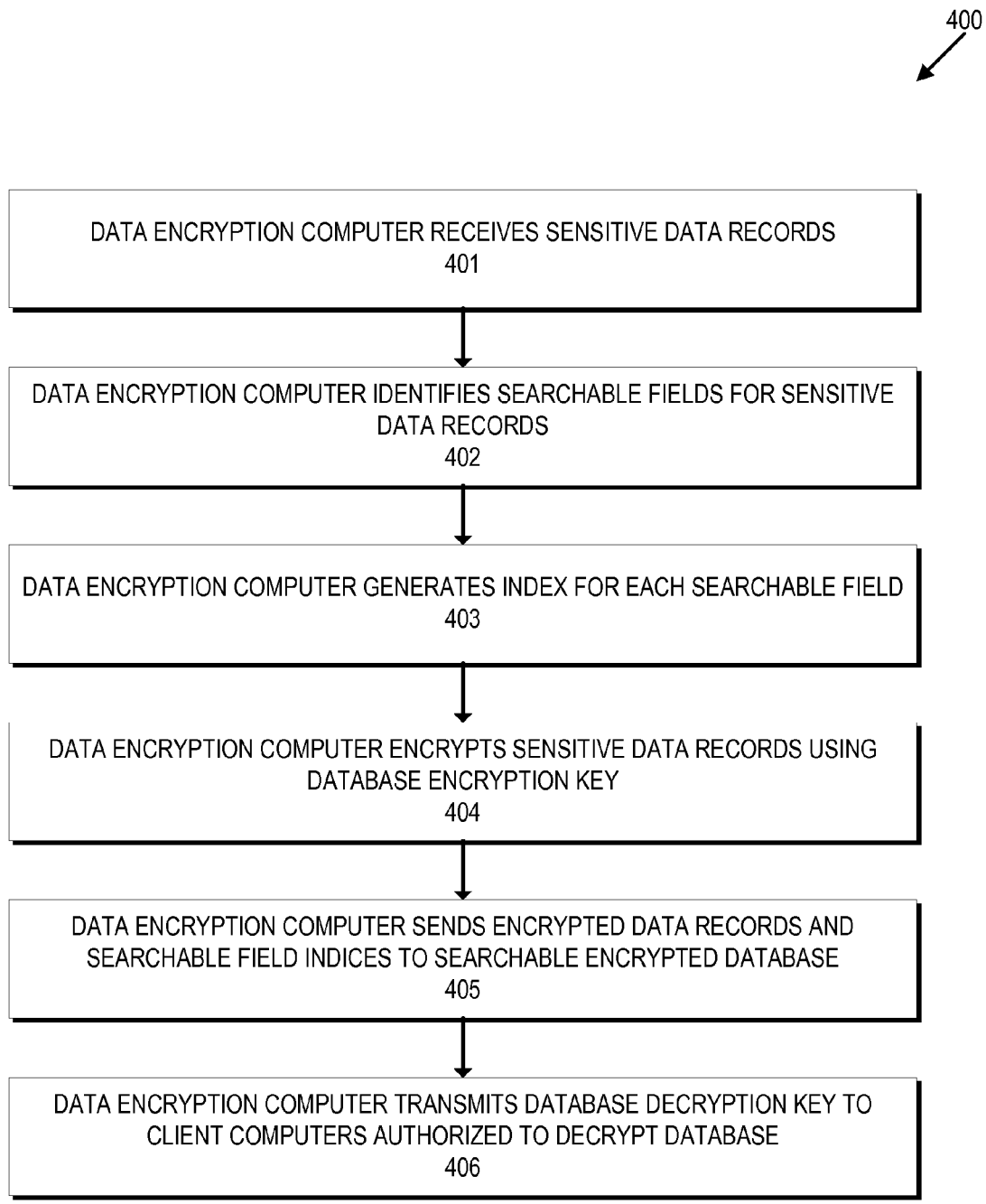
FIG. 4 shows a method for a data encryption computer to generate an encrypted searchable database comprising encrypted data records and searchable field indices.

FIG. 4 shows a method for a data encryption computer 200 to generate an encrypted searchable database comprising encrypted data records and searchable field indices.

At step 401, data encryption computer 200 receives a plurality of sensitive data records. The sensitive data records may be received from any suitable source. For example, in some embodiments, the sensitive data records may be retrieved from personal information database 220, or from a trusted database.

Table 1 shows an exemplary representation of three sensitive data records. As shown, the sensitive data records may comprise a plurality of sensitive data fields such as a user's ID, name, date of birth, primary account number (PAN), and social security number (SSN).

TABLE 1

| User ID | Name | DOB | PAN | SSN |
|---------|------|-----|-----|-----|
| jsmith45 | John Smith | Dec. 3, 1945 | 4567-8901-2345-6789 | 001-23-4567 |
| mpower | Max Power | Apr. 15, 1997 | 4285-9487-2345-6754 | 010-77-1143 |
| jt2235 | Jill Turner | Jan. 1, 1930 | 4673-2126-5623-7596 | 489-21-3532 |

At step 402, data encryption computer 200 identifies searchable fields for the sensitive data records. In some embodiments, the searchable fields may be identified from user input. In some cases, a user generating the searchable encrypted database 300 may specify one or more desired searchable fields. For example, for the data records shown in Table 1, a user may specify that the records may be searched using the user's name, the last four digits of their PAN, and the last four digits of their SSN.

Table 2 shows an exemplary representation of three sensitive data records and associated searchable fields. As shown, the searchable fields comprise a user's name, the last four digits of the user's PAN, and the last four digits of the user's SSN.

TABLE 2

| | | | | | Searchable Fields | | |
|---|---|---|---|---|---|---|---|
| | Sensitive Data Record | | | | | PAN | SSN |
| User ID | Name | DOB | PAN | SSN | Name | (last 4) | (last 4) |
| jsmith45 | John Smith | Dec. 3, 1945 | 4567-8901-2345-6789 | 001-23-4567 | John Smith | 6789 | 6789 |
| mpower | Max Power | Apr. 15, 1997 | 4285-9487-2345-6754 | 010-77-1143 | Max Power | 6754 | 1143 |
| jt2235 | Jill Turner | Jan. 1, 1930 | 4673-2126-5623-7596 | 489-21-3532 | Jill Turner | 7596 | 3532 |

At step 403, data encryption computer 200 generates a searchable field index for each searchable field. The searchable field index may comprise a plurality of searchable field index values. Each searchable field index value may be generated using sensitive data field values in a sensitive data record, and may be associated with that data record. In one example, a searchable field index may be generated for a searchable field comprising the last four digits of a user's social security number. Accordingly, if a data record associated with a user has a social security number of "001-23-4567", the searchable field value may be "4567", and the searchable field index value may be "6bfe6d73n834fhj", which may represent a HMAC generated using the searchable field value and a field key. A searchable field index may comprise searchable field index values for one or more sensitive data records.

In some embodiments of the invention, the format of the searchable field index may depend on the sensitivity of the field. For example, searchable fields with high sensitivity (e.g., part of a user's social security number) may be protected or obfuscated to a higher extent than searchable fields with low sensitivity (e.g., part of a user's ZIP code). In some embodiments, the method of FIG. 5 may be used to generate a searchable field index.

Figure 5:
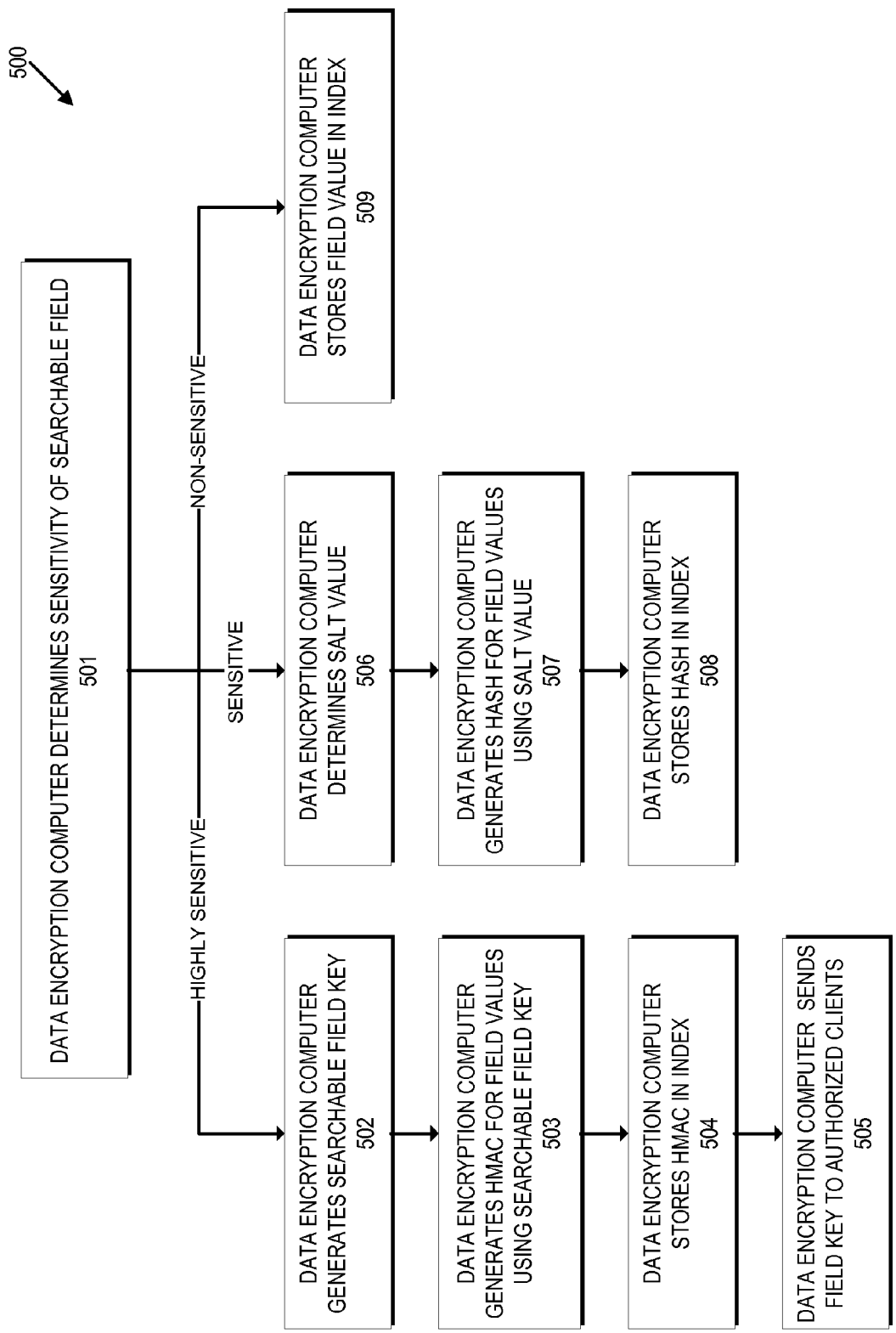
FIG. 5 shows a method for generating a searchable field index for a searchable field.

FIG. 5 shows a method 500 for generating a searchable field index for a searchable field. In some embodiments of the invention, method 500 may be performed as part of step 403 in of method 400.

At step 501, data encryption computer 200 determines the sensitivity of the searchable field. In some embodiments, the sensitivity of the searchable field may be defined a user of data encryption computer 200, or included in personal information database 220. The sensitivity of a searchable field may include an indication of the degree to which a searchable field value for the field should be protected. For example, a searchable field of the last four digits of the user may be considered "non-sensitive", because that information is generally considered publically available and not personally identifiable. However, a searchable field of the user's first and last name may be considered "sensitive", since it may indicate the identity of the user if known. Further, a searchable field of the user's full social security number may be considered "highly sensitive", as a social security number is generally expected to be kept secret.

In some embodiments of the invention, the sensitivity of a searchable field may be determined using pre-defined rules, standards, or protocols. For example, a personal information analyzer module 212 may be configured with governmental standards relating to the protection of personal information. Thus, the personal information analyzer module may be operable to determine the sensitivity of a searchable field. If the searchable field is highly sensitive, step 502 is performed. Otherwise, if the searchable field is sensitive, step 506 is performed. If the searchable field is non-sensitive, step 509 is performed.

When the searchable field is determined to be highly sensitive, at step 502 the data encryption computer 200 generates a searchable field key for the searchable field. The searchable field key may be any encryption key or other secret data. For example, the searchable field key may be a symmetric key such as AES, DES, or Blowfish.

At step 503, data encryption computer 200 generates an HMAC for each searchable field value using the searchable field key. In some embodiments, an HMAC function may be represented using the formula: $HMAC(k,m)=v$, where k refers to the searchable field key, m refers to the searchable field value for a sensitive data record, and v refers to the calculated HMAC. For example, a key k="123" may be used to generate HMAC index values for the SSN (last 4) searchable field in Table 2. In one example, if k="123", and m="4567", the HMAC v may be "6bfe6d73n834fhj". In another example, for k="123", and m="1143", the HMAC v may be "bd2b3j47x4po53t". Thus, an HMAC searchable field index value may be calculated for each searchable field value.

At step 504, data encryption computer 200 stores each HMAC searchable field index value in the searchable field index. The SSN (last 4) index in Table 3 shows one example of an searchable field index comprising HMAC index values.

At step 505, data encryption computer 200 sends the searchable field key to clients authorized to use the searchable field. For example, for the SSN (last 4) searchable field, clients authorized to search using the last four digits of a user's SSN may be provided the corresponding searchable field key.

When the searchable field is determined to be sensitive, at step 506 the data encryption computer 200 determines a salt value for the searchable field. The salt value may be any suitable data. For example, in some embodiments, the salt value may be another data field associated with the user, such as the user's username. In other embodiments, the salt value may be a random or pseudorandom number, or a predefined string.

At step 507, data encryption computer generates a hash for each searchable field value using the salt value. The salted hash may be generated using any suitable means. For example, in some embodiments, the salt and searchable field value may be appended, then hashed using a hashing algorithm such as MD5, SHA-2, or bcrypt.

At step 508, data encryption computer 200 stores each hash searchable field index value in the searchable field index. The Name index in Table 3 shows one example of a searchable field index comprising hashed index values.

When the searchable field is determined to be non-sensitive, at step 509 data encryption computer 200 stores the searchable field value as plaintext or cleartext in the searchable field index. The PAN (last 4) index in Table 3 shows one example of a searchable field index comprising hashed index values.

Table 3 shows an exemplary representation of three sensitive data records and associated searchable field indices. As shown, the searchable field indices may each be formatted according to the sensitivity of the searchable field. For example, a user's name is generally considered sensitive information, so the name searchable field index values are hashed using the SHA-2 algorithm. However, the last 4-digits of a PAN are generally not considered sensitive, and so are left in plaintext. In addition, the last 4-digits of a SSN are considered highly sensitive, and so are computed as a HMAC. Exemplary searchable field index values are shown in Table 3. It should be noted that the hash and HMAC values are truncated for ease of representation, and may be longer in some embodiments of the invention.

TABLE 3

| Sensitive Data Record | | | | | | Searchable Field Indices | |
|---|---|---|---|---|---|---|---|
| User ID | Name | DOB | PAN | SSN | Name | PAN (last 4) | SSN (last 4) |
| jsmith45 | John Smith | Dec. 3, 1945 | 4567-8901-2345-6789 | 001-23-4567 | ef61a5 . . . | 6789 | 6bfe6 . . . |
| mpower | Max Power | Apr. 15, 1997 | 4285-9487-2345-6754 | 010-77-1143 | d2d9e1 . . . | 6754 | bd2b3 . . . |
| jt2235 | Jill Turner | Jan. 1, 1930 | 4673-2126-5623-7596 | 489-21-3532 | 49eefb . . . | 7596 | e92c3 . . . |

Returning to FIG. 4, at step 404, data encryption computer 200 encrypts the sensitive data records using a database encryption key. A database encryption key may be associated with a "database decryption key", which may reverse encryption of the data. In some embodiments, In some embodiments, data encryption computer 200 may generate the database encryption key. Alternately, data encryption computer 200 may receive the database encryption key from another computing device. In some embodiments, the database may be encrypted using a single database encryption key. In other embodiments, multiple database encryption keys may be used to encrypt the database. For example, each database encryption key may be associated with a subset of database rows or columns. For example, a first database encryption key may be used to encrypt sensitive data records with a user identifier starting with the letters A-M, whereas a second database encryption key may be used to encrypt sensitive data records with a user identifier starting with the letters O-Z. In another example, different database encryption keys may be used to encrypt various sensitive data fields. For example, a sensitive data field comprising a user's telephone number may be encrypted using a first encryption key, and a sensitive data field comprising the user's social security number may be encrypted using a second encryption key. In some embodiments, certain client computers may not be provided with some database decryption keys in order to limit access to specific sensitive data fields. For example, a client computer may be given access to users' telephone numbers but not users' social security numbers by providing the client computer with the first decryption key but not the second decryption key.

Table 4 shows an exemplary representation of three encrypted data records and searchable field indices. As shown, all sensitive data fields in each record are combined and encrypted. Thus, the sensitive data is unreadable without access to the decryption key.

TABLE 4

| Encrypted Data Record Encrypted Data | Searchable Field Indices | | |
|---|---|---|---|
| | Name | PAN (last 4) | SSN (last 4) |
| 7b6bb17508eeebb026305b3013057c983a0edcc . . . | ef61a5 . . . | 6789 | 6bfe6 . . . |
| 9d34af2eb64a1cd3e59b91e6d3e176a884773514 . . . | d2d9e1 . . . | 6754 | bd2b3 . . . |
| b0a922f14604703134cba8f3dfa1903c738d9c1ee7 . . . | 49eefb . . . | 7596 | e92c3 . . . |

At step 405, data encryption computer 200 sends the encrypted data records and searchable field indices to the searchable encrypted database 300. In some embodiments, it may be acceptable to send the encrypted data records and searchable field indices over an untrusted network, as all sensitive information is already encrypted or otherwise obfuscated. In some embodiments, the encrypted data records and searchable field indices may be sent via a database access server 106.

At step 406, the data encryption computer 200 distributes the database decryption key to client computers 101-104 authorized to decrypt the database. The database decryption key may be the same key as the database encryption key (e.g., in the case of symmetric encryption), or a different key (e.g., in the case of asymmetric encryption). A determination of client computers authorized to decrypt the database may be made using user authentication module 211 or any other suitable means. In embodiments where multiple database encryption keys are used, data encryption computer 200 may distribute each corresponding decryption key only to client computers authorized to use the key.

III. Exemplary Searchable Encrypted Database Usage Methods

Figure 6:
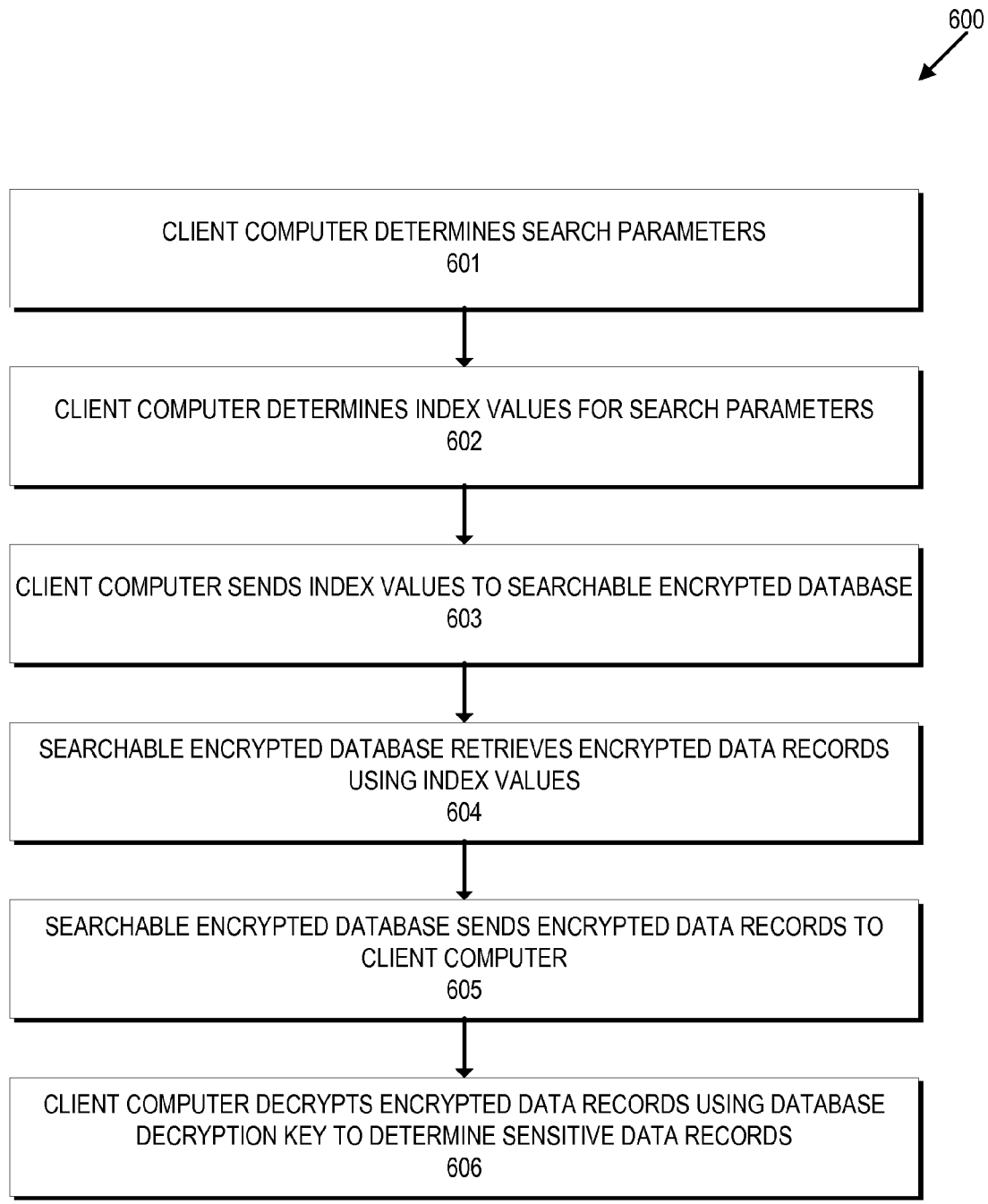
FIG. 6 shows a method for searching for and decrypting encrypted data records.

FIG. 6 shows a method 600 for searching for and decrypting encrypted data records. Typically, method 600 may be performed after a searchable encrypted database 300 has been generated and keys have been transmitted to authorized clients.

At step 601, a client computer 101 determines search parameters for a search of the searchable encrypted database 300. Search parameters may include a logical expression comprising of one or more searchable field values or other parameters used to retrieve encrypted data records from a searchable encrypted database 300. For example, a record for a user "John Smith" may be retrieved by providing a first searchable field value of "John Smith" corresponding to his name, and a second searchable field value of "4567" corresponding to the last 4 digits of his credit card number. Search parameters may comprise any number of searchable field values and/or logical combinations thereof. In some embodiments, search parameters may comprise Boolean expressions (e.g., with AND, OR, and NOT logical operators). In one example, search parameters may be used to retrieve records where a shipping zip code is 94111 and a billing zip code is not 94111.

At step 602, client computer 101 determines searchable field index values for the search parameters. In some embodiments of the invention, the index values may be generated by determining the format of the searchable field. In some embodiments, method 500 may be performed by client computer 101 in order to determine the appropriate format. In other embodiments, the format may be pre-defined, such as in an object relational model (ORM).

For example, for search parameters "John Smith" and "4567", corresponding searchable field index values may be "ef61a579c907bbed674c0" (generated using a SHA-2 hash of the name, and "4567" (the plaintext of the last four digits), respectively.

At step 603, client computer 101 sends the searchable field index values to searchable encrypted database 300. The index values may be sent over an unsecure connection, since they are not decipherable by the database or any third party. In some embodiments of the invention, the index values may be sent as part of a SQL query. Thus, the search may be serviced by any standard database supporting SQL queries.

At step 604, searchable encrypted database 300 retrieves the encrypted data records using the received index values. In some embodiments, an encrypted data record may be retrieved if it matches all specified index values. For example, for the searchable encrypted database of Table 4, an index value of "ef61a579c907bbed674c0" corresponding to the user's name and an index value of "6789" corresponding to the last 4 digits of the user's PAN may match the encrypted data record "b0a922f14604703134cba8f3dfa1903c738d9c1ee7 . . . ".

At step 605, searchable encrypted database 300 sends the encrypted data records to client computer 101. As the encrypted data records are also protected from compromise, they may be transmitted over an unsecure connection.

At step 606, client computer 101 decrypts the encrypted data records using a database decryption key to determine the sensitive data records. Typically, the client computer 101 may have previously received the database decryption key, such as during step 406 of method 400. For example, the encrypted data record "b0a922f14604703134cba8f3dfa1903c738d9c1ee7 . . . " may be decrypted, to determine the sensitive data record for jsmith45 as shown in Table 1.

IV. Exemplary Payment Processing Systems and Methods

Figure 7:
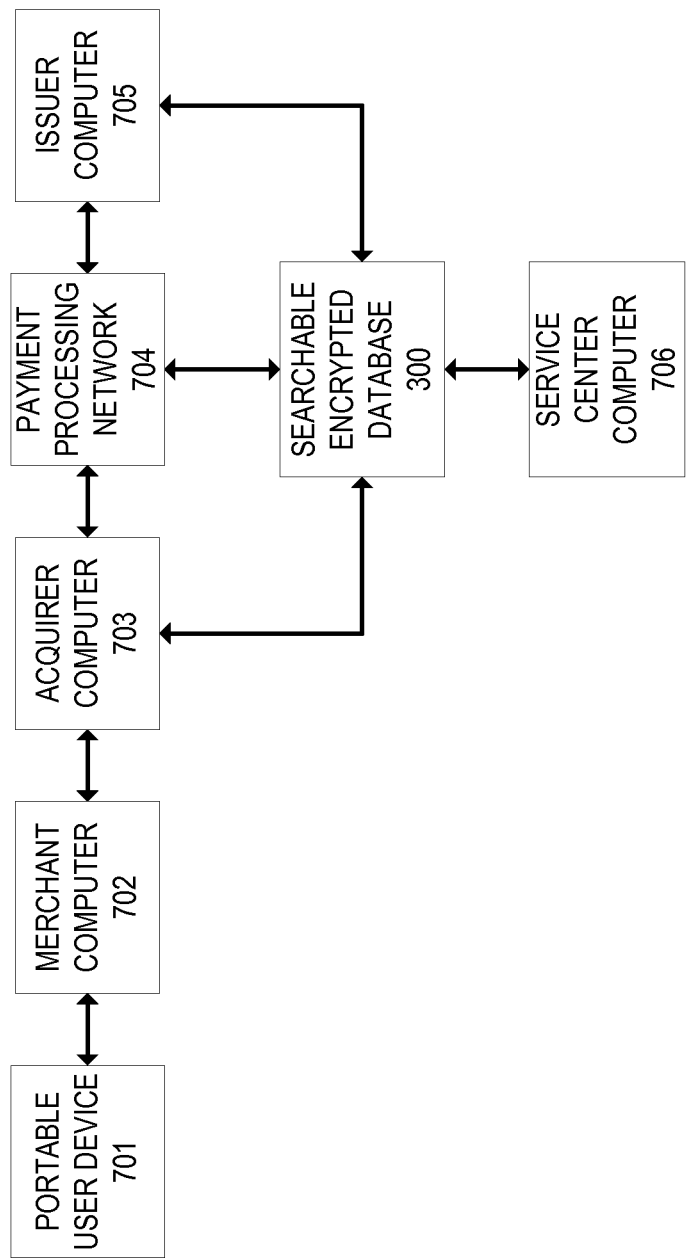
FIG. 7 shows an exemplary system for using searchable encrypted database according to an embodiment of the invention.

FIG. 7 shows an exemplary system for using searchable encrypted database 300 according to an embodiment of the invention. The system comprises user (not shown) who may operate a portable user device 701. The user may use portable device 701 to conduct purchase transactions at an access device (not shown) connected to a merchant computer 702. Merchant computer 702 may be connected to acquirer computer 703. Acquirer computer 703 may be connected to issuer computer 705 via payment processing network 704. Payment processing network 704 may also be connected to searchable encrypted database 300. Searchable encrypted database 300 may also be connected to a service center computer 706.

As used herein, a "service center computer" may typically refer to a client computer or other computing device that provides access to a searchable encrypted database 300 of user information. In some embodiments of the invention, service center computer 706 may be used to provide service for user accounts, transactions, or other activity relating to a user. For example, in one embodiment, the service center computer may be operated by an issuer maintaining an account for the user.

As used herein, an "issuer" may typically refer to a business entity (e.g., a bank) that maintains financial accounts for a user and often issues a portable user device 701 such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant computer 702, acquirer computer 703, payment processing network 704, and issuer computer 705) may comprise one or more computer apparatuses to enable communications, or to perform one or more of the functions described herein.

The payment processing network 704 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 704 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 704 may use any suitable wired or wireless network, including the Internet.

In a typical payment transaction, the user purchases a good or service at merchant 702 using a portable user device 701. The user's portable user device 701 can interact with an access device at a merchant associated with merchant computer 702. For example, the user may tap the portable user device 701 against an NFC reader in the access device 702. Alternately, the user may indicate payment details to the merchant electronically, such as in an online transaction.

An authorization request message is generated by the access device and is then forwarded to the acquirer computer 703. After receiving the authorization request message, the authorization request message is then sent to the payment processing network 704. The payment processing network 704 then forwards the authorization request message to the corresponding issuer computer 705 associated with the issuer of the portable user device 701.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 705 receives the authorization request message, the issuer computer 705 sends an authorization response message back to the payment processing network 704 to indicate whether the current transaction is authorized (or not authorized). In some embodiments, issuer computer 705 may examine the testing transaction score to determine whether the current transaction should be authorized. The payment processing network 704 then forwards the authorization response message back to the acquirer 703. In some embodiments, payment processing network 704 may decline the transaction even if issuer computer 705 has authorized the transaction, for example depending on the value of the fraud risk score or testing transaction score. The acquirer 703 then sends the response message back to the merchant computer 702.

An "authorization response message" may be an electronic message reply to an authorization request message generated by an issuing financial institution or a payment processing network. The authorization response message may include, by way of example, one or more of the following status indicators: "Approval"—indicating a transaction was approved; "Decline"—indicating a transaction was not approved; or "Call Center"—indicating a response is pending more information and the merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant computer 703 receives the authorization response message, the access device coupled to the merchant computer 1502 may then provide the authorization response message for the user. The response message may be displayed on the contactless access device, or may be printed out on a receipt. Alternately, if the transaction is an online transaction, the merchant may provide a web page or other indication of the authorization response message.

At the end of the day, a normal clearing and settlement process can be conducted by the payment processing network 704. A clearing process is a process of exchanging financial details between an acquirer and an issuer to facilitate posting of transactions to a customer's payment account and reconciliation of the user's settlement position.

In some embodiments of the invention, portable user device 701, merchant computer 702, acquirer computer 703, payment processing network 704, and issuer computer 705 may save data to searchable encrypted database 300.

For example, some embodiments of the invention may be used to save payment data and other account data for users to searchable encrypted database 300. As a payment transaction is being processed by acquirer computer 703, payment processing network 704, and/or issuer computer 705, it may be saved to searchable encrypted database 300. Thus, searchable encrypted database may comprise transactions conducted by a user and other account information. In one example, an issuer may outsource customer service to a third-party service center. The issuer may save encrypted account records to the searchable encrypted database 300 and provide the service center computer with any database decryption keys and searchable field keys necessary to access the database. The representatives at the service center may contact and be contacted by users for a variety of account management issues, such as reporting transactions as fraudulent, changing account information, etc. Accordingly, a representative may use service center computer 706 to connect to searchable encrypted database 300 to retrieve various user information and service the user.

Figure 8:
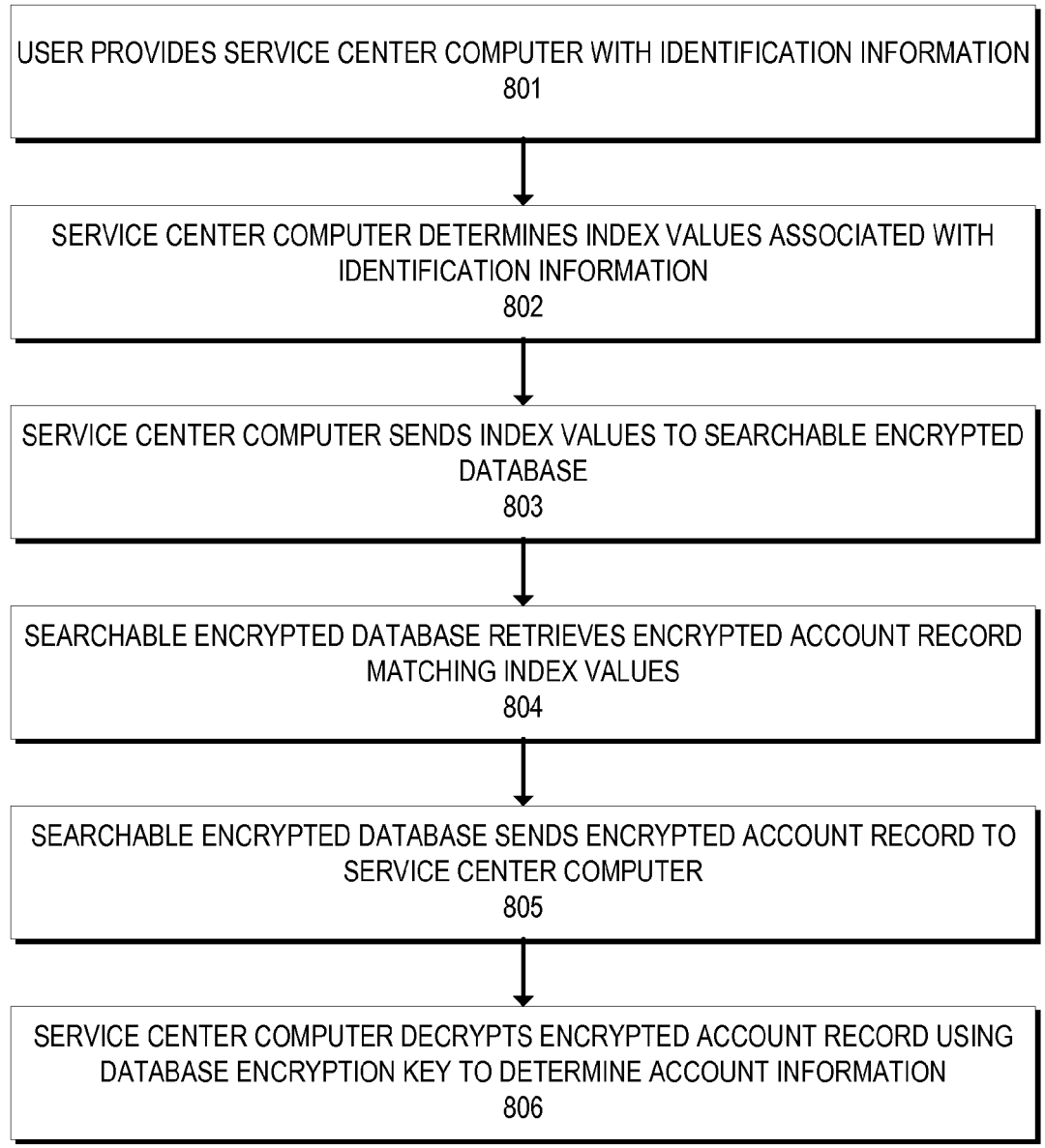
FIG. 8 describes a method for a service center computer to retrieve account information for a user from a searchable encrypted database.

FIG. 8 describes a method 800 for a service center computer 706 to retrieve account information for a user from a searchable encrypted database 300. In some cases, the user may place a phone call or conduct a voice chat with a representative operating a service center computer 706. Alternately, in some cases the user may interface with service center computer 706, such as if the user connects to a web site hosted using service center computer 706.

At step 801, the user provides service center computer 706 with identification information. Identification information may include any information suitable to retrieve an encrypted account record for a user from the searchable encrypted database. For example, the user may provide the service center computer with a name, address, social security number, or any other suitable information.

At step 802, service center computer 706 determines index values associated with the identification information. The index values may be generated by any suitable means, such as those described for step 602 of method 600. In some embodiments, the issuer computer 705 may send to service center computer 706 a schema or other specification of the format of searchable encrypted database 300. For example, issuer computer 705 may send a database schema describing the structure of the searchable encrypted database 300.

At step 803, service center computer sends the determined index values to the searchable encrypted database 300.

At step 804, searchable encrypted database 300 retrieves an encrypted account record matching the received index values. In some embodiments of the invention, if multiple encrypted account records are retrieved, the searchable encrypted database 300 may prompt the service center computer 706 to transmit additional identification information. Thus, steps 801-804 may be repeated until sufficient index values are received to identify a single encrypted account record. If no account records match the provided index values, the searchable encrypted database 300 may indicate failure to the service center computer 706.

At step 805, searchable encrypted database 300 sends the encrypted account record to the service center computer 706. At step 806, service center computer 706 decrypts the encrypted account record using a database decryption key to determine the user's account information. Once the user's account information is determined, the user may be serviced.

V. Exemplary Computer Apparatuses

FIG. 16 shows an example of a payment device 901" in the form of a card. As shown, the payment device 901" comprises a plastic substrate 901(*m*). In some embodiments, a contactless element 901(*o*) for interfacing with an access device may be present on, or embedded within, the plastic substrate 901(*m*). User information 901(*p*) such as an account number, expiration date, and/or a user name may be printed or embossed on the card. A magnetic stripe 901(*n*) may also be on the plastic substrate 901(*m*). In some embodiments, the payment device 901" may comprise a microprocessor and/or memory chips with user data stored in them.

Figure 9:
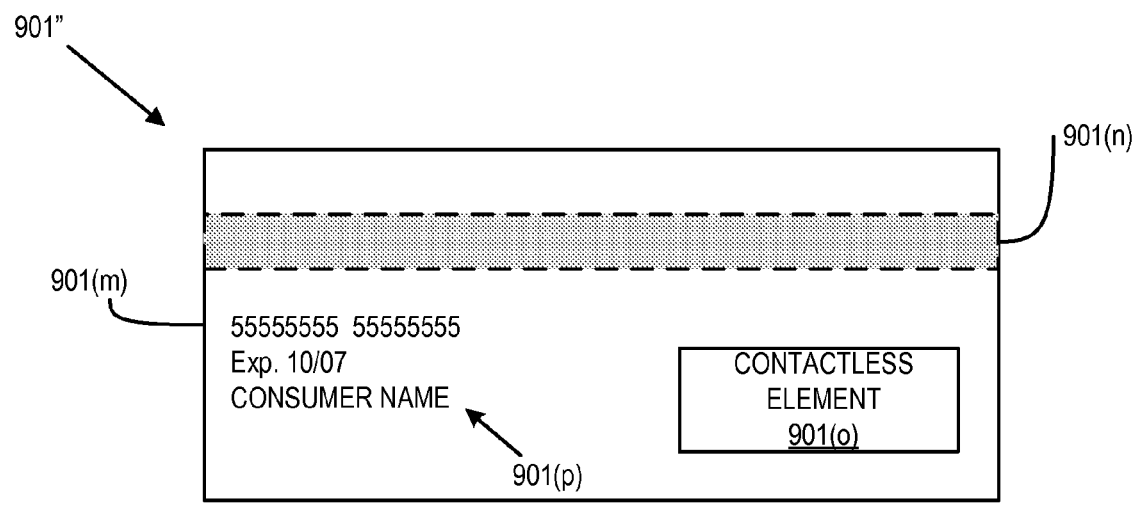
FIG. 9 shows an example of a payment device in the form of a card.

As noted above and shown in FIG. 9, the payment device 901" may include both a magnetic stripe 901(*n*) and a contactless element 901(*o*). In some embodiments, both the magnetic stripe 901(*n*) and the contactless element 901(*o*) may be in the payment device 901". In some embodiments, either the magnetic stripe 901(*n*) or the contactless element 901(*o*) may be present in the payment device 901".

Figure 10:
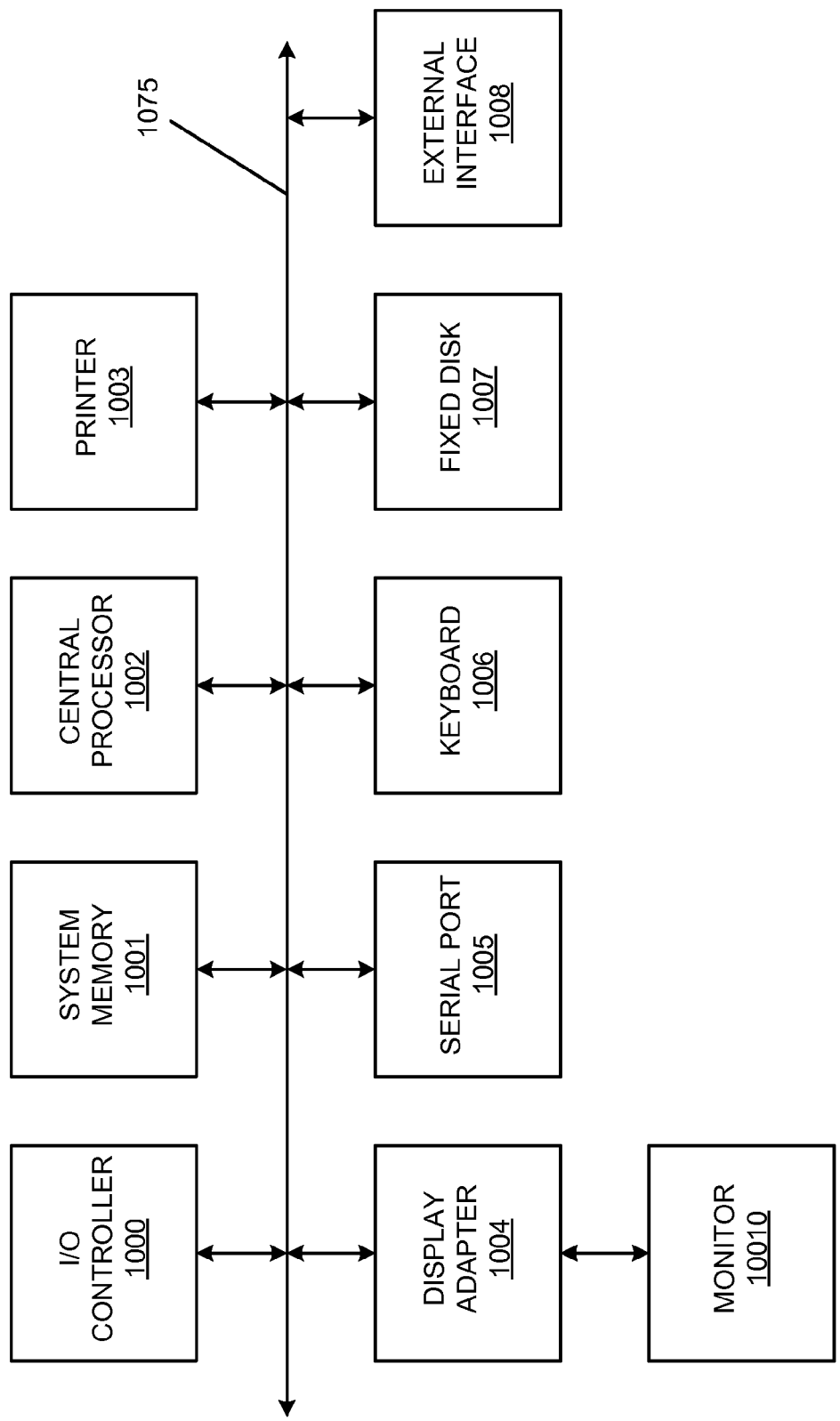
FIG. 10 is a high level block diagram of a computer system that may be used to implement any of the entities or components described for embodiments of the invention.

FIG. 10 is a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004. Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the central processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

VI. Additional Embodiments

One embodiment of the invention discloses a system comprising a client computer and a database access server. The database access server comprises a processor and a non-transitory computer-readable storage medium, comprising code executable by the processor for implementing a method comprising receiving one or more index values for searchable field indices, wherein the index values are generated using personal information of a user, retrieving one or more encrypted data records using the index values, and sending the one or more encrypted data records. The data encryption computer comprises a processor and a non-transitory computer-readable storage medium, comprising code executable by the processor for implementing a method comprising sending the one or more index values, receiving the one or more encrypted data records, and decrypting the one or more encrypted data records.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A data encryption computer comprising:
   a processor; and
   a non-transitory computer-readable storage medium, comprising code executable by the processor for implementing a method comprising:
      receiving a plurality of data records;
      identifying one or more searchable fields for the data records;
      generating a searchable field index for each of the one or more searchable fields based on which one of at least three sensitivity levels that each searchable field corresponds to,
      wherein when the searchable field corresponds to a first sensitivity level, the searchable field index is in a plain text format, when the searchable field corresponds to a second sensitivity level, the searchable field index is a hash value, and when the searchable field corresponds to a third sensitivity level, the searchable field index is an encrypted hash value;
      encrypting the data records using at least one database encryption key; and
      providing a searchable encrypted database comprising the searchable field indices and the encrypted data records to a database access server, wherein the plurality of client computers are operable to obtain the data records from the database access server using the database encryption key.

2. The data encryption computer of claim 1, wherein the encrypted hash value is a hash-based message authentication code generated using a searchable field key.

3. The data encryption computer of claim 2, wherein the searchable field key is sent to one or more of the plurality of client computers that are authorized to search using the searchable field.

4. The data encryption computer of claim 1, wherein when the searchable field corresponds to the second sensitivity level, generating a searchable field index for each of the one or more searchable fields includes determining a salt value for the corresponding searchable field.

5. The data encryption computer of claim 4, wherein the salt value is a username.

6. The data encryption computer of claim 1, wherein a first subset of the data records containing a first type of information is encrypted with a first database encryption key, and a second subset of the data records containing a second type of information is encrypted with a second database encryption key.

7. The data encryption computer of claim 1, wherein a first subset of the sensitive data records corresponding to a first subset of one or more users is encrypted with a first database encryption key, and a second subset of the sensitive data records corresponding to a second subset of one or more users is encrypted with a second database encryption key.

8. A computer-implemented method comprising:
   receiving, by a processor, a plurality of data records;
   identifying, by the processor, one or more searchable fields for the data records;
   generating, by the processor, a searchable field index for each of the one or more searchable fields based on which one of at least three sensitivity levels that each searchable field corresponds to,
   wherein when the searchable field corresponds to a first sensitivity level, the searchable field index is in a plain text format, when the searchable field corresponds to a second sensitivity level, the searchable field index is a hash value, and when the searchable field corresponds to a third sensitivity level, the searchable field index is an encrypted hash value;
   encrypting, by the processor, the data records using at least one database encryption key; and
   providing, by the processor, a searchable encrypted database comprising the searchable field indices and the encrypted data records to a database access server, wherein the plurality of client computers are operable to obtain the data records from the database access server using the database encryption key.

9. The computer-implemented method of claim 8, wherein the encrypted hash value is a hash-based message authentication code generated using a searchable field key.

10. The computer-implemented method of claim 9, wherein the searchable field key is sent to one or more of the plurality of client computers that are authorized to search using the searchable field.

11. The computer-implemented method of claim 8, wherein when the searchable field corresponds to the second sensitivity level, generating a searchable field index for each of the one or more searchable fields includes determining a salt value for the corresponding searchable field.

12. The computer-implemented method of claim 11, wherein the salt value is a username.

13. The computer-implemented method of claim 8, wherein a first subset of the data records containing a first type of information is encrypted with a first database encryption key, and a second subset of the data records containing a second type of information is encrypted with a second database encryption key.

14. The computer-implemented method of claim 8, wherein a first subset of the sensitive data records corresponding to a first subset of one or more users is encrypted with a first database encryption key, and a second subset of the sensitive data records corresponding to a second subset of one or more users is encrypted with a second database encryption key.

15. A computer-implemented method comprising:

receiving, by a processor, from a data encryption computer, a searchable encrypted database comprising a plurality of searchable field indices and a plurality of encrypted data records, wherein the encrypted data records are encrypted using at least one database encryption key, wherein a format of each searchable field index is determined based on which one of at least three sensitivity levels that an associated searchable field corresponds to, and wherein when the searchable field corresponds to a first sensitivity level, the searchable field index is in a plain text format, when the searchable field corresponds to a second sensitivity level, the searchable field index is a hash value, and when the searchable field corresponds to a third sensitivity level, the searchable field index is an encrypted hash value;

receiving, by a processor, index values for one or more of the searchable field indices from a client computer in the plurality of client computers;

retrieving, by the processor, one or more encrypted data records using the index values; and sending, by the processor, the one or more encrypted data records to the client computer.

16. The computer-implemented method of claim 15, wherein the encrypted hash value is a hash-based message authentication code.

17. The computer-implemented method of claim 15, wherein the client computer is a service center computer, wherein the index values are generated using identification information provided by a user.

18. The computer-implemented method of claim 17, further comprises:

when multiple encrypted data records match the index values, prompting the service center computer to send additional identification information.

19. The computer-implemented method of claim 15, wherein a first subset of the encrypted data records containing a first type of information is encrypted with a first database encryption key, and a second subset of the encrypted data records containing a second type of information is encrypted with a second database encryption key.

20. The computer-implemented method of claim 15, wherein a first subset of the sensitive data records corresponding to a first subset of one or more users is encrypted with a first database encryption key, and a second subset of the sensitive data records corresponding to a second subset of one or more users is encrypted with a second database encryption key.

* * * * *